United States Patent [19]
Krugman

[11] Patent Number: 5,579,238
[45] Date of Patent: Nov. 26, 1996

[54] INSTRUMENTED COMPUTER KEYBOARD FOR PREVENTION OF INJURY

[76] Inventor: Michael Krugman, 41 W. 86th St. #7K, New York, N.Y. 10024

[21] Appl. No.: 517,265

[22] Filed: Aug. 21, 1995

Related U.S. Application Data

[63] Continuation-in-part of Ser. No. 327,157, Oct. 21, 1994, abandoned.
[51] Int. Cl.$^6$ ..................................................... G01H 11/00
[52] U.S. Cl. .................... 364/508; 364/550; 364/551.01; 364/413.02
[58] Field of Search ..................................... 128/774, 782; 364/508, 550, 551.01, 413.01, 413.02, 413.04; 341/22, 23, 26–28, 34; 400/491.3, 480, 481; 345/156, 158, 168; 84/737, 192, 687; 340/407.2

[56] References Cited

U.S. PATENT DOCUMENTS

| | | | |
|---|---|---|---|
| 3,968,488 | 7/1976 | Bovio | 341/33 |
| 4,795,888 | 1/1989 | MacFarlane | 235/145 A |
| 5,002,065 | 3/1991 | LaCourse et al. | 128/739 |
| 5,054,361 | 10/1991 | Usa | 84/737 |
| 5,086,686 | 2/1992 | Misawa et al. | 84/718 |
| 5,166,466 | 11/1992 | Yamauchi | 84/690 |
| 5,212,473 | 5/1993 | Louis | 341/27 |
| 5,230,345 | 7/1993 | Curran et al. | 128/739 |
| 5,247,129 | 9/1993 | Nozaki et al. | 84/192 |
| 5,269,004 | 12/1993 | Comerford et al. | 341/22 |
| 5,305,238 | 4/1994 | Starr, III et al. | 364/569 |
| 5,341,133 | 8/1994 | Savoy et al. | 341/22 |
| 5,348,405 | 9/1994 | Lupkas | 400/472 |
| 5,434,566 | 7/1995 | Iwasa et al. | 400/481 |
| 5,447,167 | 9/1995 | Fleischaker | 128/782 |

OTHER PUBLICATIONS

"Entrapment Neuropathies of the Upper Extremities", by D. M. Dawson, M.D., *The New England Journal of Medicine*, vol. 329, No. 27, Dec. 30, 1993.

"How to Recognize, Treat, and Avoid the Occupational Hazards of Keyboard Performance", by R. E. Markison, *Keyboard*, pp. 93–approx. 107, Apr. 1994.

"Fingertip Kinematics and Forces During Typing", by J. T. Dennerlein, E. R. Serina, C. D. Mote, Jr., D. Rempel, American Society of Biomechanics, 17th Annual Meeting, 1993.

"Fingertip Forces While Using Three Different Keyboards", by D. Rempel and J. Gerson, Proceedings of 1991 Human Factors Society 35th Annual Meeting, San Fransisco.

"Fingertip Impact Loading During Keyboard Use", by D. Rempel, J. T. Dennerlein, C. D. Mote, Jr., and T. Armstrong, The Second North American Congress on Biomechanics, Chicago, Aug. 24–28th, 1992.

"Investigation of Techniques Designed to Evaluate Finger Forces in Alphanumeric Keyboard Work", by B. Martin, T. Armstrong, M. Reed, J. Dennerleine, D. Rempel, 14th International Society of Biomechanics Congress, Paris, Jul. 4, 1993.

"Fingertip Force Histories from Multiple Keys during Typing", by W. P. Smutz, J. T. Dennerlein, D. C. Mote, Jr., D. Rempel, American Society of Biomechanics 17th Annual Meeting, 1993.

*Primary Examiner*—Emanuel T. Voeltz
*Assistant Examiner*—Hal D. Wachsman
*Attorney, Agent, or Firm*—Eliot S. Gerber

[57] ABSTRACT

A system to monitor the force with which a user strikes keys on a computer keyboard and to alert a user if the force used is greater than a threshold. The system includes a keyboard having a casing and a programmable computer processor coupled to the keyboard. The programmable computer processor includes a sound card having a microphone input port. A vibration sensor (transducer) is mounted on the casing of the keyboard to sense vibrations when the user strikes the keys of the keyboard. The sensor is coupled to the sound card of the programmable computer processor via the microphone input port. The sensor generates electrical signals as input to the sound card. An alarm is output in real-time to the user of the keyboard when the sensor's signals are greater than the threshold.

17 Claims, 5 Drawing Sheets

INSTRUMENTED COMPUTER KEYBOARD FOR PREVENTION OF INJURY

RELATED APPLICATION

This application is a continuation-in-part application partly based upon patent application Ser. No. 08/327,157, filed Oct. 21, 1994 and now abandoned.

FIELD OF INVENTION

The present invention is directed to a keyboard, and more particularly a keyboard for use with a computer that decreases the risk of injury to the hand, wrist and arm.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

Repetitive strain disorders associated with prolonged use of keyboards, particularly computer keyboards, are a rapidly growing problem. Chronic musculoskeletal disorders such as carpal tunnel syndrome, muscle pain syndromes, wrist tenosynovitis, and epicondylitis have been linked to prolonged use of computer keyboards. Injuries to the hands, wrists and arms are associated with prolonged, repetitive, and excessively forceful typing. These injuries result in pain and disability, declining employee morale and productivity, and increased medical compensation costs.

Therefore, there is a need for a device that will help to prevent repetitive strain disorders among users of computer keyboards.

To date, the keyboard industry has focused on re-designing the shape of the standard keyboard. However, as there are many keyboards presently in use, to re-design and replace these keyboards would be extremely costly.

A recent study has shown that typical keyboard users exert 2.5 to 5 times more force than is necessary to activate the keys on the keyboard. These users often "bottom out" the keys on every keystroke. One writer observes that the force exerted at the tip of the thumb is magnified tenfold as it acts upon the basal joint at the wrist, and another speculates that the force exerted at the fingertips may be amplified by a factor of 2 to 4 as it acts upon the flexor tendons of the fingers.

In sum, computer users strike the keys with excessive force, and this force may act upon the tendons, joints and other structures of the fingers, wrist and arm with potentially destructive force. This contributes to the high incidence of musculoskeletal disorders among computer keyboard users.

Another study by Michael Feuerstein, Tom Armstrong and Paul Hickey, "Keyboard Force, Fatigue and Pain in Symptomatic and Asymptomatic Wordprocessors", 12th Congress of the International Ergonomics Association, confirmed that professional word processors type 4–5 times harder than necessary. The researchers also found that among workers with symptoms of repetitive strain, the ones with the most severe symptoms strike the keys significantly harder than those with minimal symptoms. Furthermore, the workers with the highest typing force tend to minimize their symptoms and the impact of their symptoms on their functioning. The authors speculate that this may create a "high risk" condition for increased frequency, severity and/or duration of injury.

A study by David Rempel and Jack Gerson, "Fingertip Forces While Using Three Different Keyboards", Proceedings of Human Factors Society, 35th Annual Meeting, 1991, concludes that high fingertip forces may contribute to the development of chronic musculoskeletal disorders, and that a relatively minor reduction in applied fingertip force will significantly reduce the daily cumulative force applied by the fingers.

It is common practice among medical professionals to advise keyboard users who suffer from repetitive strain disorders to use less force in activating the keys. However, it is well known that most users cannot comply with this advice, especially under stressful workplace conditions with deadlines, productivity quotas, etc.

Therefore, there is a need for a device that will assist computer keyboard users to strike the keys with less force and interrupt their patterns of repetitive movement. In particular, there is a need for a device that can be used with any existing keyboard and personal computer, including those already installed and in use, and that is low in cost and simple for the average user to install and operate.

Ergonomic studies have used various techniques to measure the force with which a user's fingers strike one or more keys on the keyboard. For example, Rempel, Dennerlein, Mote and Armstrong describe in "Fingertip Impact Loading During Keyboard Use", Proceedings of NACOB II, The Second North American Congress on Biomechanics, Chicago, 1992, pp. 425–456, a method to measure fingertip force during a keystroke using a piezoelectric load cell mounted in a keycap. The keyboard of this study was instrumented to measure vertical fingertip force applied by a finger during a typical typing task. The study by Rempel and Gerson (cited above) used a strain gauge load cell to measure and collect peak fingertip force. A study by Dennerlein, Serina, Mote and Rempel, reported in "Fingertip Kinematics And Forces During Typing", American Society of Biomechanics, 17th Annual Meeting, 1993, used a quarter bridge strain gauge load cell placed above the keyswitch and below the keycap of the "f" key to measure vertical fingertip impact force. In this study, the bridge signal was amplified and filtered before being sampled by an A/D board in the computer. A study titled "Fingertip Force Histories From Multiple Keys During Typing" by Smutz, Dennerlein, Mote and Rempel, American Society of Biomechanics, 17th Annual Meeting, 1993, instrumented multiple keys of a standard keyboard to collect fingertips' force histories.

These studies have used devices to measure and record fingertip force for scientific evaluation. In particular, these studies require that one or more keys of the keyboard be modified so as to include an instrument to measure force when the modified key(s) is used. Moreover, these devices, apart from being costly to produce, do not provide real-time feedback to a user of the keyboard as the user actually types.

There is need for a simple-to-install system to determine fingertip force in real-time when a keyboard is being used by a user and to interactively (in real time) alert the user if the user is striking the keys too hard, thus interrupting the cycle of repetitive typing motion.

SUMMARY OF THE INVENTION

The present invention is directed to a system to monitor the force exerted by a user on the keys of a keyboard, and to alert the user instantaneously if the force exerted exceeds a selected level. Moreover, the present invention can be used to store information as to how hard the user is striking the keys of the keyboard, and provide diagnostic information and corrective tutorial information based upon the individual user's typing behavior.

In the representative embodiment, the present invention includes a standard computer keyboard which is coupled to a computer. A sensor, which monitors the amount of force exerted on the keys of the keyboard, is coupled to or is part of the keyboard. The computer monitors the signals from the sensor and alerts the user when the user's typing force exceeds a selected threshold.

In one embodiment, a vibration sensor is attached to the outside casing of the keyboard to pick up and monitor vibrations when the user strikes keys. The vibration sensor is a piezoelectric transducer which is coupled to the sound card of the computer, e.g., through the sound card's microphone input port. An alarm sounds or a visual indication is displayed on a computer output device (such as a monitor coupled to the computer) when a key is struck too hard or when, over a period of time, it is determined that the user, on average, strikes the keys of the keyboard too hard.

Accordingly, key impact can be measured and monitored, and the user can be interactively notified in real-time, if the user is hitting keys on the keyboard with too much force.

In the system of the present invention as described above, existing keyboards and computers can be used. The vibration sensor can easily be installed on the outside of the casing of the keyboard. There is no need to modify or adapt the internal workings of the keyboard or the computer. The vibration sensor is a transducer which converts the force (strength) of vibrations into electrical signals corresponding to the force of the vibrations.

The present invention can also be incorporated into the design of new keyboards, including ergonomically designed keyboards. In such cases, it is advantageous to mount the sensor internally, inside the keyboard casing, thus not requiring external attachment of the sensor.

In an alternative embodiment a transducer, for example, a strain gauge or load cell or force-sensitive resistor of a type available from Interlink Electronics of Camarillo, Calif., is placed inside the casing of the keyboard, under the tray on which the keyswitches are mounted, to measure pressure on the keys rather than vibrations of the keyboard. This requires a current to be supplied to the load cell, preferably from the central power supply of the computer. The voltage potential across the load cell is monitored and digitized via an analog/digital converter, and these signals are entered into the digital serial port of the computer. The signals are monitored, and if a selected pressure threshold is reached, the user is notified in real-time by an alarm.

The present invention allows the user to set different alarm sounds or indications. The user is also given the option of setting different threshold levels, above which the alarm will be set off. Alternatively, the present invention can use scientifically determined threshold levels above which it is likely that, after prolonged typing, physical damage occurs.

The present invention can also be used to change the function of a given key on the keyboard. When a key is hit with a certain force (for example, below 1.5N-Newtons) the key is given its usual meaning. When that same key is hit with force above a predetermined threshold (e.g. above 1.5N), then the key is given a different meaning. Such different meanings for one key usually require more than one key at a time to be pressed.

The present invention can also be used in conjunction with existing or specially developed computer games. In the case of existing games, the present invention is configured in either of two ways. In a first case, activating a control key for the game with a force above a predetermined threshold would alter the scoring or play of the same. For example, firing guns of a rocket ship ten times without exceeding a preset force threshold would result in bonus points, but each firing in excess of the threshold would result in a loss of these points, plus penalties. In the second case activating the firing button with force greater than a predetermined threshold would fire a larger rocket, multiple rockets, or another weapon entirely. Additionally, specially developed games could be devised to take advantage of the present invention which require the typing of text commands of one or more characters without exceeding the selected force threshold.

DETAILED DESCRIPTION

Figure 1:
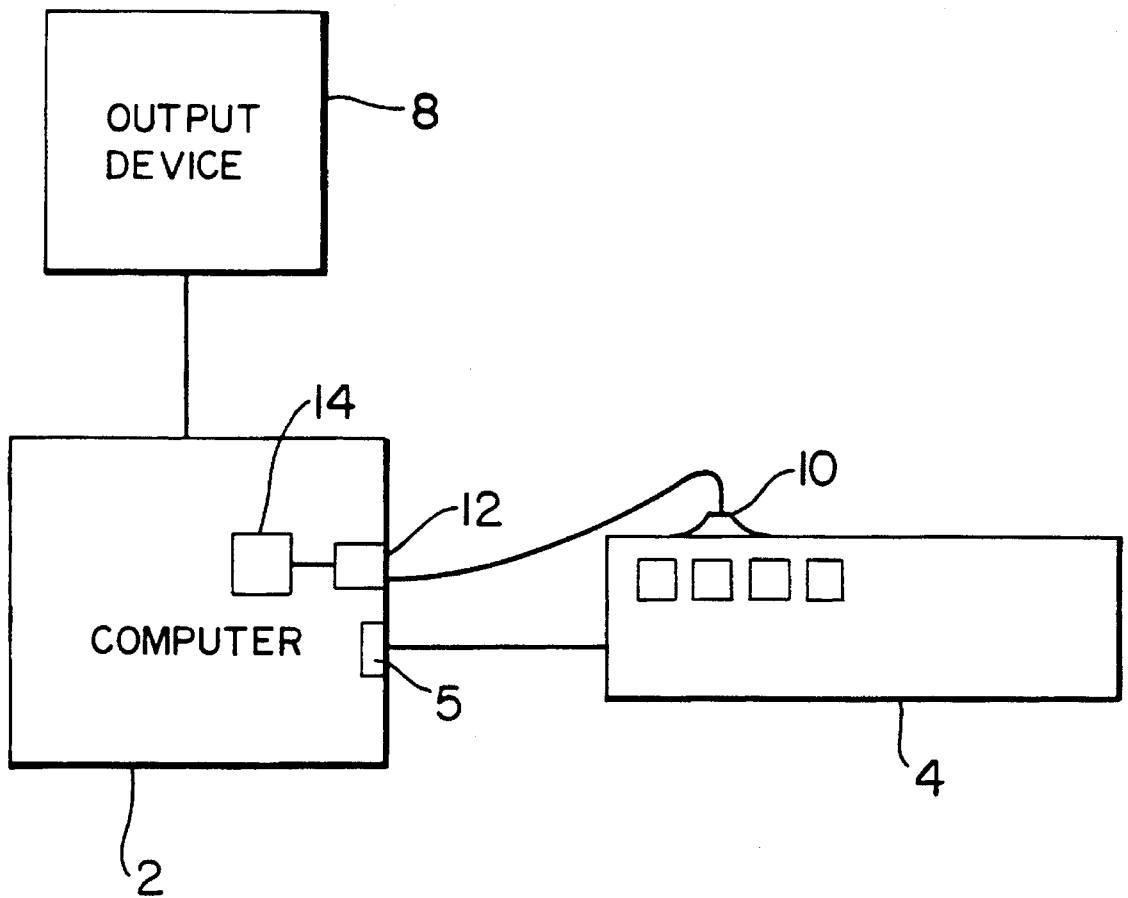
FIG. 1 is a block diagram of a representative embodiment of the system of the present invention.

Referring now to the drawings, and initially FIG. 1, there is illustrated in block diagram form a representative embodiment of the system of the present invention. A programmable computer 2, such as, for example, an IBM personal computer or Apple Macintosh computer, is coupled to a keyboard 4 in the usual way for example, via a keyboard input port 5. The keyboard 4 is used by a user to enter information, for example typing a letter or memo that is processed by a word processor program executed by the computer 2.

Figure 2:
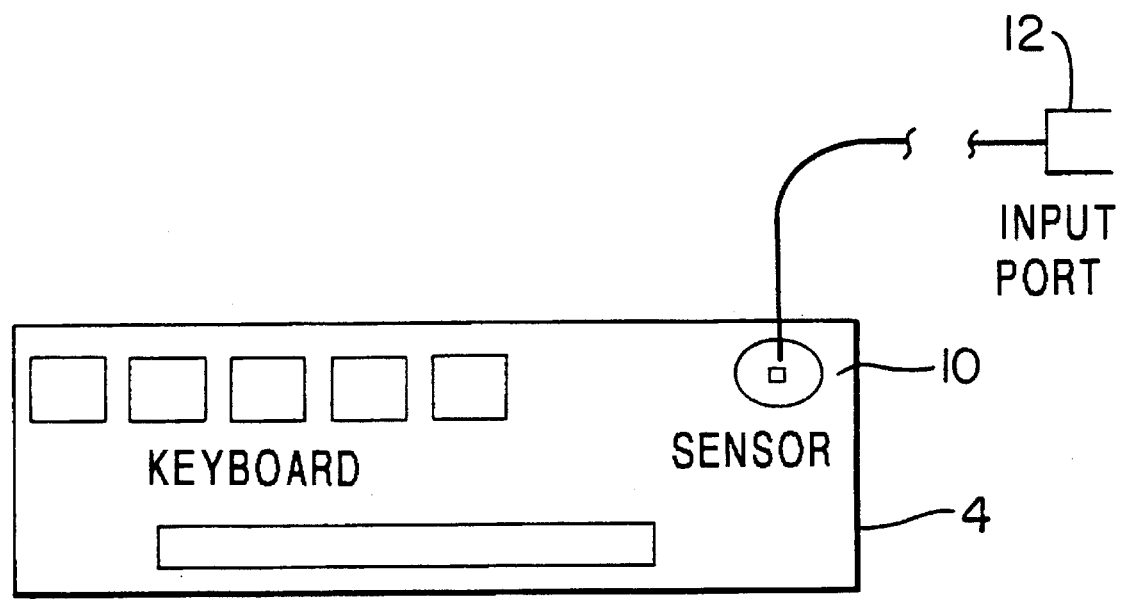
FIG. 2 is a more detailed diagram of the keyboard and vibration sensor of FIG. 1.

A vibration sensor 10 is attached on the outside of the casing of the keyboard 4 to pick up and monitor vibrations when the user strikes keys on the keyboard 4. In the representative embodiment, the vibration sensor 10 is a piezoelectric pickup or accelerometer of the type available from the Dean Markeley Company, and is mounted on the keyboard casing with a removable adhesive. It is a piezoelectric disk which converts the amplitude (not frequency) of vibrations into electrical signals. The stronger is the force (amplitude-strength) of the vibrations the larger is the corresponding electrical signal representing such vibrations. The sensor 10 responds to vibrations created by the user's keystroke force. FIG. 2 shows in greater detail an example of the location at which the sensor 10 can be attached to the keyboard 4. As will be realized, the sensor can be easily added and removed by a user, and placed in different positions on the keyboard 4.

The vibration sensor 10 is also coupled typically by a cable to the sound card 14 of the computer 2. In the representative embodiment, the vibration sensor's electrical output is fed to the sound card 14 of the computer 2, via, for example, the microphone input port 12 of the sound card 14.

Alternatively, and not shown, the sensor's electrical output may be converted to digital data by an A/D (Analog-Digital) converter whose output is connected to a serial digital data input port of the computer, such as the SCSI port. The electrical signals received from the vibration sensor 10 are processed by the sound card 14 and by a computer program executed by the computer 2. For example, the signals are filtered, preferably by a notch filter to eliminate 60 Hz noise. Optionally, the filtered signals can be stored in a memory of the computer 2 for later processing or analysis. The filtered signals are measured against a predetermined threshold that represents the point at which the user should be notified that he or she is exerting too much force when using the keys on the keyboard 4. If the filtered signal reaches or surpasses the threshold, then the user is notified in real-time (i.e., as the user types using the keyboard 4). Alternatively, the filtered signals (and the number of times the user reaches the threshold) can be stored for later analysis or for output to the user.

Typically, the user is notified that the user is exerting too much force on the keys of the keyboard 4 by a sound indication produced, for example, by the sound card 14 of the computer 2. Alternatively (or in addition), the user can be notified by a visual indication on an output device 8 coupled to the computer 2, such as, for example, a CRT monitor.

Figure 5:
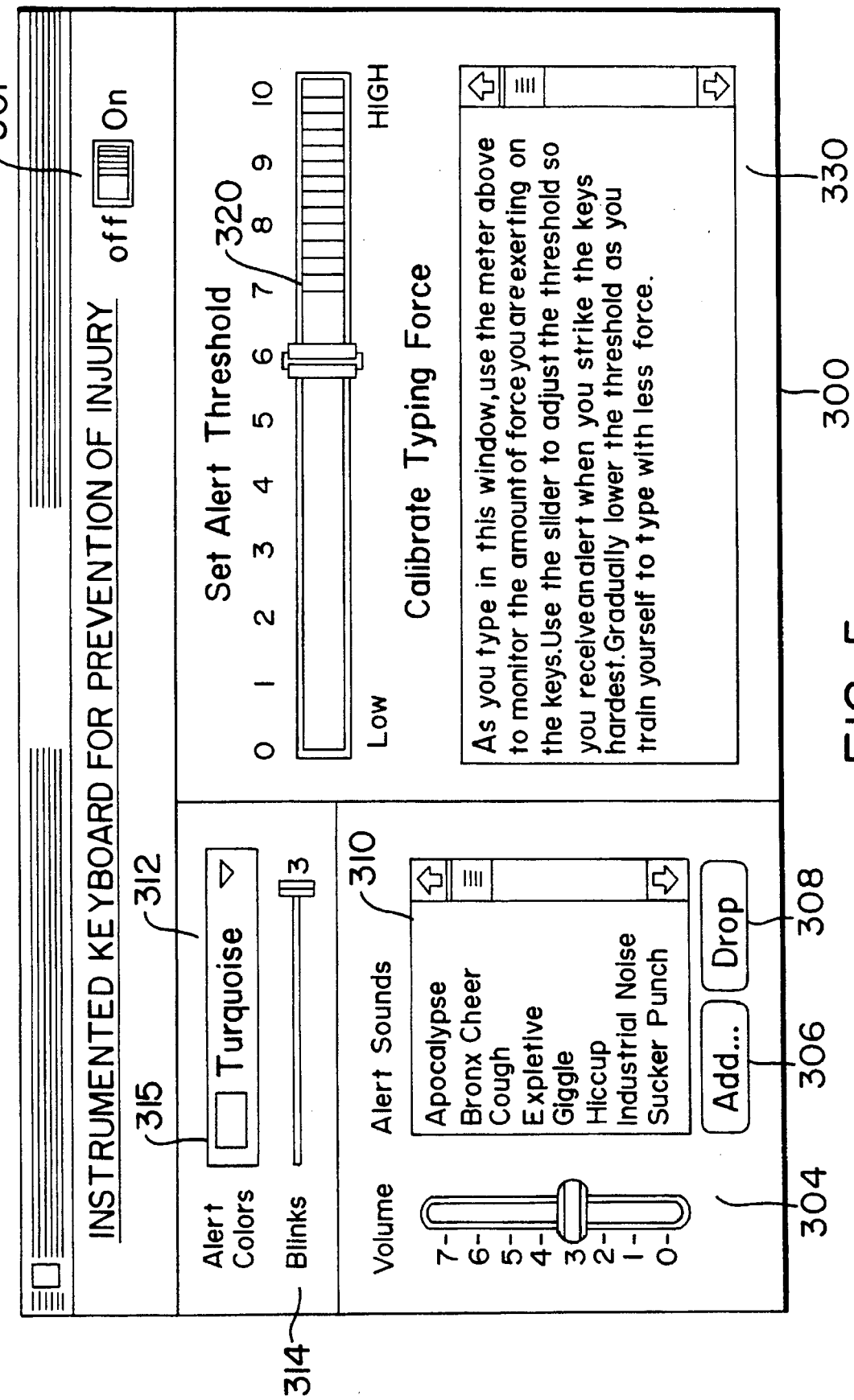
FIG. 5 is a representative example of the control panel used to control the operations of the present invention.

The present invention includes a computer controlled control panel 300 (a representative embodiment of which is shown in FIG. 5) that can be displayed on the output device 8. The control panel 300 allows the user to activate the following functions:

1. Turn visual and aural alarms on and off (using, for example, control switch 303);
2. Vary threshold of force at which the alarms will be deployed (using, for example, control slider 302);
3. Vary the sound level of the aural alarm (using, for example, control bar 304);
4. Choose a variety of sounds for the aural alarm, including sound files from other programs, vocal sounds, commercial announcements or slogans, and sounds recorded directly into the computer via a microphone (for example, by adding (306) or dropping (308) sounds from a list of alert sounds (310).
5. Select as a visual alarm an indicator function in which the menu bar at the top of the display screen that is shown on the output device 8 will flash in a different color when the force threshold is exceeded.
6. Select a visual alarm in the form of a graphic element such as an icon, animation, logo, or commercial device that appears on the computer display screen for a brief period when the force threshold is exceeded;
7. Choose a variety of colors of visual display elements for the visual alarm (for example, using menu 312) to vary the number of flashes of the menu bar (for example, using slider 314); and to vary the position at which the graphic elements appear on the screen;
8. Select a sequence of different alarms for successive activation of the visual and/or aural alarms. For example: the first time the force threshold is exceeded, a bell will ring. The second time, a buzzer sounds. The third time, the menu bar flashes red; and
9. Substitute keyboard commands or events for the aural or visual alarms. For example, when the letter "D" is typed with enough force to activate the alarm threshold, the computer would output Command –D, an action which usually requires more than one key to be pressed.
10. Activate game functions (as above).

The control panel 300 of the present invention is set, operated and interpreted in the way that the control panel of the Macintosh computer is operated.

As shown in FIG. 5, the on/off switch 301 of the example control panel 300 deactivates the features of the present invention without closing the application. The alert colors menu 312 is a popup menu that allows a user to choose what color of the menu bar, desktop or scroll bars in the active window will blink to alert the user when the user hits a key with a force greater than the set alert threshold as set by the set threshold control slider 302. Items (e.g., menu bar, desktop, scroll bar) to be colored can be selected from an options menu in the menu bar (not shown). The name of the selected color and a swatch of that color 315 appear in the menu 312. The blinks slider control 314 allows a user to select the number of times the alert colors will blink on and off with each alert; e.g., 0, 1, 2, 3, random.

The threshold control slider 302 allows the user to set the threshold above which an alert will occur. A typing impact meter 320 interactively shows the level of force on the keys as the user types.

A calibrate typing force window 330 comprises an editable text field in which the user can type to monitor, in real-time, how hard the user is typing, and to set an appropriate threshold for the user's typing habits.

Figure 3:
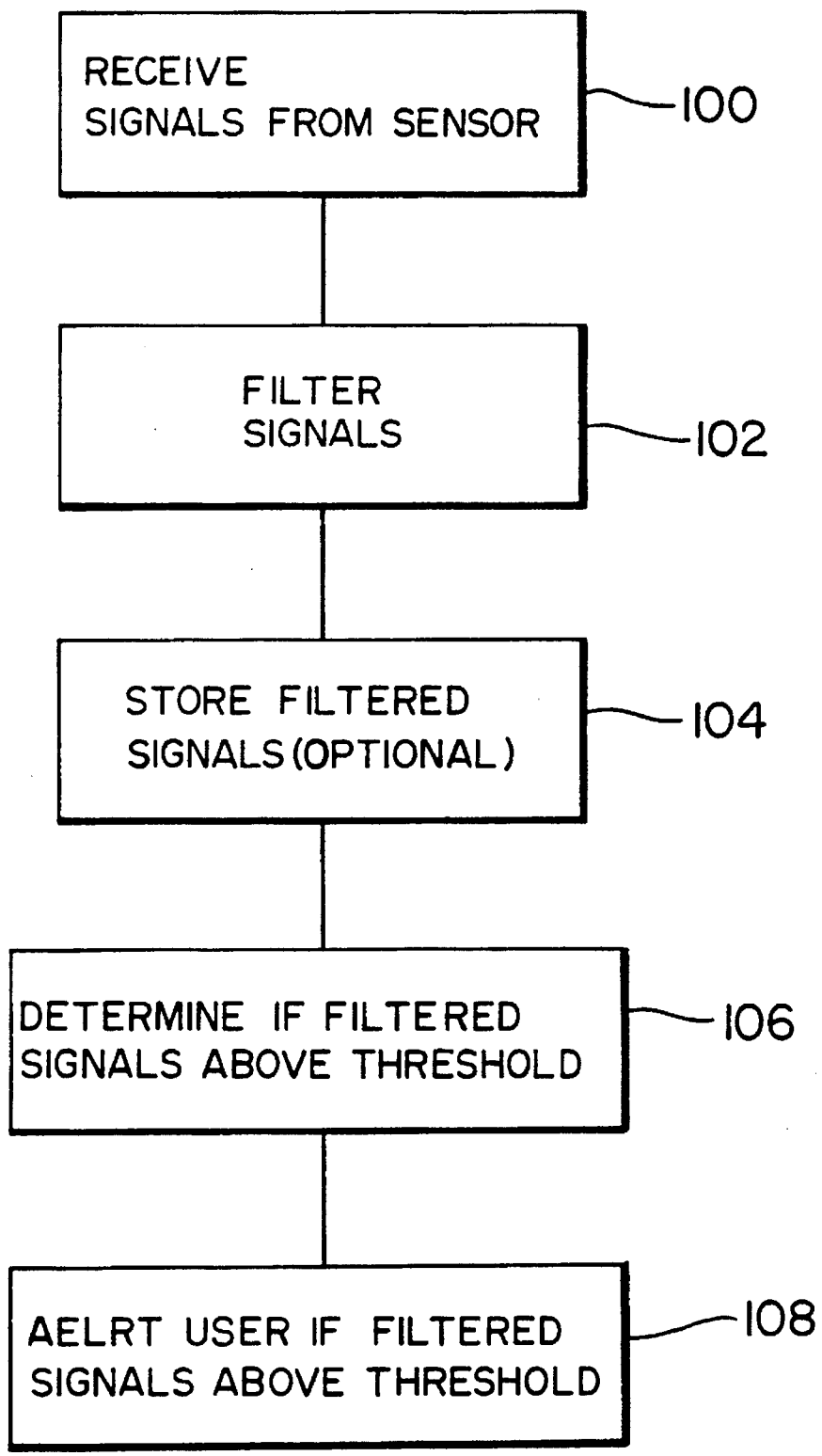
FIG. 3 is a flow chart describing typical steps performed by the computer of FIG. 1 according to a representative embodiment of the present invention.

FIG. 3 summarizes in flow chart form the steps performed by the computer 2 (typically, the sound card 14 of the computer 2) according to a representative embodiment of the present invention. The computer 2 receives electrical signals from the sensor 10 attached to the keyboard 4 (step 100). The signals represent the vibrations that occur when the user strikes keys on the keyboard.

The signals are filtered (step 102), for example, to remove unwanted background sound and 60 Hz electrical noise that are picked up by the sensor 10. Optionally, the filtered signals can be stored for later processing (step 104). The signals are processed in real-time to determine if the signals are above a set threshold, e.g., if the user is striking the keys of the keyboard 4 too hard, then the user is notified (step 108).

Figure 4:
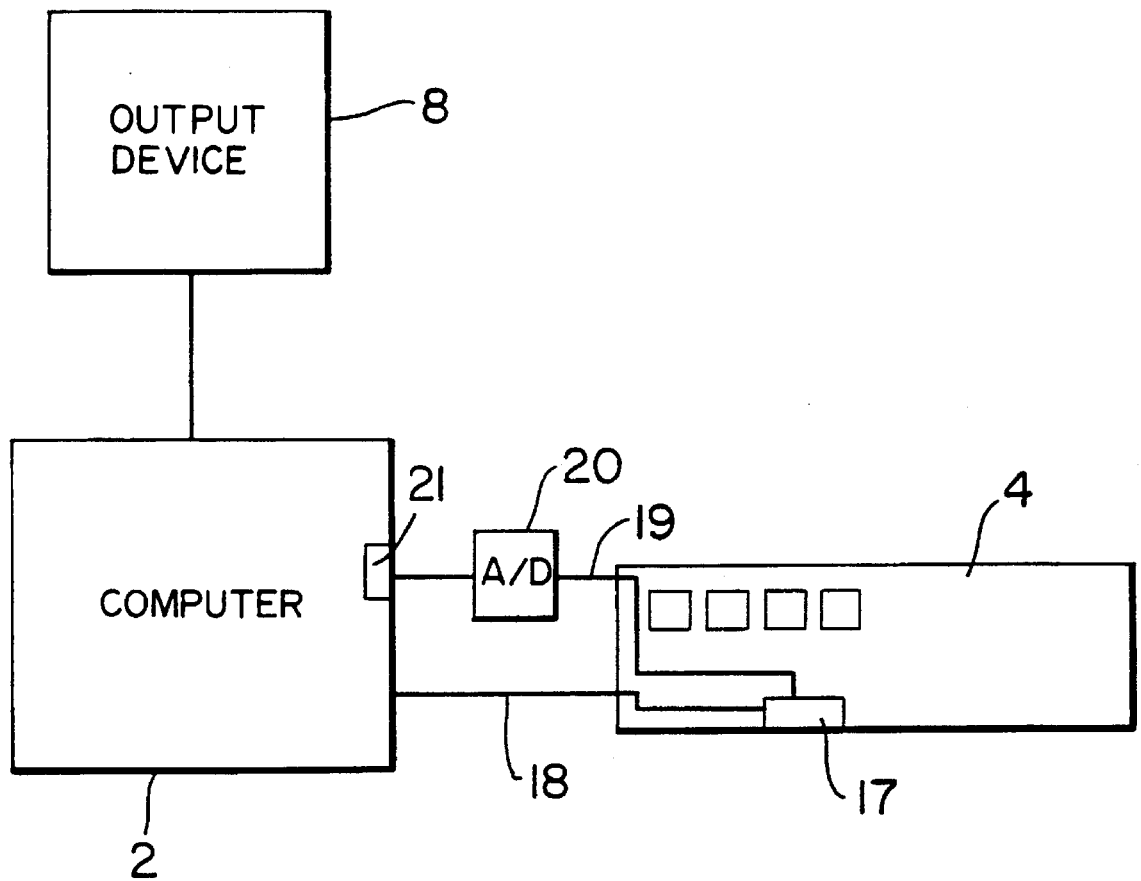
FIG. 4 is a block diagram of an alternative embodiment of the system of the present invention.

FIG. 4 represents an alternative embodiment of the present invention. In this alternative embodiment a transducer 17, for example, a strain gauge or load cell or a force-sensitive resistor of a type available from Interlink Electronics of Camarillo, Calif., is placed inside the casing of the keyboard 4 under the tray on which the keyswitches are mounted, to measure pressure on the keys rather than vibrations of the keyboard. This requires a current to be supplied to the load cell preferably from the central power supply of the computer on line 18, which may also be the power line from the computer to power the keyboard 4. The voltage potential across the transducer 17 is monitored, transmitted over line 19, and digitized via an analog/digital converter 20, and these signals are entered into the digital serial port 21 of the computer. The signals are monitored, at the serial port, and if a selected pressured threshold is reached, the user is notified in real time by the alarm.

What is claimed is:

1. A system to monitor keystroke force and alert the user in real time if the keystroke force used exceeds a selected threshold, the system comprising:

a computer keyboard to enter words and numbers and having a casing and a plurality of keys;

a computer for processing the entered words and numbers, the computer being coupled to the keyboard, a sound card coupled to the computer and having a microphone input port; a sensor means for sensing vibrations when the user strikes the keyboard and for outputting electrical signals corresponding to the strength of the vibrations, the sensor means being coupled to the microphone input port and being mounted on the keyboard casing; and computer program means within the computer to activate an alarm to the user when the vibrations exceed a selected threshold.

2. The system of claim 1 wherein the sound card generates a sound or sequence of sounds as the alarm.

3. The system of claim 1 wherein the alarm is a sound or sequence of sounds recorded in the sound card via a microphone is the alarm.

4. The system of claim 1 further comprising a monitor coupled to the computer processor, and wherein the alarm is a visual indicator displayed on the monitor.

5. The system of claim 4 wherein the visual indicator is an animation.

6. The system of claim 1 further comprising means operated by the user for setting the selected threshold.

7. The system of claim 1 wherein the sensor is an accelerometer.

8. The system of claim 1 wherein the sensor means is a piezoelectric transducer.

9. A system to monitor keystroke force and to alert a user if the keystroke force used exceeds a predetermined threshold, the system comprising:

a computer keyboard to enter words and numbers and having a plurality of keys;

a programmable computer processor coupled to the keyboard, the programmable computer processor for processing the entered words and numbers; a sound card coupled to the computer processor;

sensor means for sensing vibrations when the user strikes the keyboard, the sensor means being coupled to the sound card of the programmable computer processor, the sensor means providing electrical signals representing the keystroke force as input to the sound card; and alarm means controlled by the programmable computer processor for generating an alarm to the keyboard user whenever the signals exceed a predetermined threshold.

10. The system of claim 9 wherein the sensor means is an accelerometer.

11. The system of claim 9 wherein the sensor means is a piezoelectric transducer.

12. A method to monitor keystroke force and alert the user in real-time if the keystroke force used exceeds a selected threshold, the method comprising:

the user striking the keys of a computer keyboard to enter words and numbers into a computer which processes the words and numbers, the keyboard having a casing and a plurality of keys;

sensing vibrations of the casing when the keys are struck by outputting electrical signals corresponding to the strength of the vibrations using a sensor, connecting the sensor to a microphone input port of a computer sound card which is coupled to the computer, the sensor being mounted on the keyboard casing; and using computer program means within the computer to activate an alarm to warn the user when the vibrations exceed a selected threshold.

13. The method of claim 12 and generating a sound or sequence of sounds as the alarm from the sound card.

14. The method of claim 12 and generating a sound or sequence of sounds as the alarm from sounds recorded in the sound card via a microphone.

15. The method of claim 12 and displaying a visual indicator on a monitor coupled to the computer processor as the alarm.

16. The method of claim 15 wherein the visual indicator is an animation.

17. The method of claim 12 and instructing the user to set the selected threshold.

\* \* \* \* \*